(12) United States Patent
Schellekens et al.

(10) Patent No.: US 9,309,150 B2
(45) Date of Patent: Apr. 12, 2016

(54) TWO PART SIZING COMPOSITION FOR COATING GLASS FIBRES AND COMPOSITE REINFORCED WITH SUCH GLASS FIBRES

(71) Applicant: DSM IP ASSETS B.V., Heerlen (NL)

(72) Inventors: Ronald Michaël Alexander Maria Schellekens, Echt (NL); Luc Elza Florent Leemans, Echt (NL); Frédéric Van Hoof, Battice (BE); Nadia Masson, Battice (BE)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/386,666

(22) PCT Filed: Mar. 18, 2013

(86) PCT No.: PCT/EP2013/055559
§ 371 (c)(1),
(2) Date: Sep. 19, 2014

(87) PCT Pub. No.: WO2013/139732
PCT Pub. Date: Sep. 26, 2013

(65) Prior Publication Data
US 2015/0045476 A1 Feb. 12, 2015

(30) Foreign Application Priority Data

Mar. 20, 2012 (EP) .................................. 12160284

(51) Int. Cl.
| | |
|---|---|
| C08K 9/08 | (2006.01) |
| C03C 25/36 | (2006.01) |
| C08J 5/08 | (2006.01) |
| C08G 59/32 | (2006.01) |
| C08G 59/42 | (2006.01) |
| C08K 3/40 | (2006.01) |
| C08L 63/00 | (2006.01) |
| C03C 25/28 | (2006.01) |
| C08L 67/02 | (2006.01) |

(52) U.S. Cl.
CPC ................. *C03C 25/36* (2013.01); *C03C 25/28* (2013.01); *C08G 59/3218* (2013.01); *C08G 59/42* (2013.01); *C08J 5/08* (2013.01); *C08K 3/40* (2013.01); *C08L 63/00* (2013.01); *C08L 67/02* (2013.01); *C08J 2363/00* (2013.01); *C08J 2367/02* (2013.01); *C08L 2203/12* (2013.01); *C08L 2205/03* (2013.01)

(58) Field of Classification Search
CPC ............. C08J 5/08; C08G 59/42; C08L 63/00
See application file for complete search history.

(56) References Cited

U.S. PATENT DOCUMENTS

| | | | |
|---|---|---|---|
| 2004/0258912 A1 | 12/2004 | Piret et al. | |
| 2008/0241533 A1* | 10/2008 | Dijt | C03C 25/26 |
| | | | 428/375 |

FOREIGN PATENT DOCUMENTS

| | | |
|---|---|---|
| EP | 2 199 265 | 6/2010 |
| JP | 2006/016559 | 1/2006 |
| WO | WO 01/49627 | 7/2001 |
| WO | WO 2008/073503 | 6/2008 |
| WO | WO 2009/062137 | 5/2009 |

OTHER PUBLICATIONS

International Search Report for PCT/EP2013/055559 mailed Dec. 3, 2013.

* cited by examiner

*Primary Examiner* — Kuo-Liang Peng
(74) *Attorney, Agent, or Firm* — Nixon & Vanderhye P.C.

(57) ABSTRACT

A pellet comprising glass fibers and a thermoplastic polyester matrix, wherein the glass fiber at least partially has been coated with a two-part sizing composition comprising: (C) A precursor comprising: (a) an aminosilane and (b) a polymer or copolymer containing carboxylic acid and/or anhydride, both having a functionality, $F \geq 3$, and (D) A binder comprising a multifunctional epoxy resin of functionality, $F \geq 3$, and wherein the pellet has been subjected to a solid state post condensation process (SSPC).

13 Claims, 2 Drawing Sheets ns and/or strength, typically carbon, glass or aramide fibres, are embedded in a polymeric matrix have substantially higher mechanical properties allowing to reach very advantageous mechanical properties to density ratios. The reinforcing fibres may be short, long or continuous. When the mechanical properties of continuous fibre reinforced composites can be very high, the geometry of parts made of such composites is limited mostly to thin wall geometries. On the other hand, although the mechanical properties of short fibre reinforced composites are lower than the former, there is no limit to the geometry of part manufactured therewith, as they can be produced by extrusion or injection moulding.

TWO PART SIZING COMPOSITION FOR COATING GLASS FIBRES AND COMPOSITE REINFORCED WITH SUCH GLASS FIBRES

This application is the U.S. national phase of International Application No. PCT/EP2013/055559 filed 18 Mar. 2013 which designated the U.S. and claims priority to EP 12160284.1 filed 20 Mar. 2012, the entire contents of each of which are hereby incorporated by reference.

TECHNICAL FIELD

The present invention relates to the field of glass fibre reinforced composites and, in particular, in the form of a pellet comprising chopped glass fibers and a thermoplastic polyester matrix, such as PET.

BACKGROUND FOR THE INVENTION

Polymeric materials have many attractive properties, but their mechanical properties are insufficient for many structural applications. Fibre reinforced composites, wherein approximately 6 to 25 µm diameter fibres having high stiffness and/or strength, typically carbon, glass or aramide fibres, are embedded in a polymeric matrix have substantially higher mechanical properties allowing to reach very advantageous mechanical properties to density ratios. The reinforcing fibres may be short, long or continuous. When the mechanical properties of continuous fibre reinforced composites can be very high, the geometry of parts made of such composites is limited mostly to thin wall geometries. On the other hand, although the mechanical properties of short fibre reinforced composites are lower than the former, there is no limit to the geometry of part manufactured therewith, as they can be produced by extrusion or injection moulding.

When a fibre reinforced composite is submitted to a stress field, the stress is transferred from the matrix to the fibres through the matrix-fibre interface. If the latter is strong, the whole load is transferred to the fibre and the mechanical properties are high. If, on the other hand, the interfacial bond between matrix and fibres is low, a crack may initiate at and propagate along the fibre-matrix interface resulting in a premature failure. It is therefore very important to enhance the bond between matrix and fibres. The mechanical properties of short fibre reinforced composites are particularly sensitive to the interfacial strength between polymer matrix and fibres, because of the short size of the latter.

In order to allow handling of the fibres and to enhance interfacial adhesion with the matrix they are embedded in, the fibres are coated with a sizing which composition depends on the nature of the reinforcing fibre to be sized and on the matrix the fibres are to be used with. Glass fibres are usually sized with a silane based composition since Si—O—Si covalent bonds can be formed between, on the one hand, the glass fibre surface and silanols obtained by hydrolysing of the alkoxysilanes of the sizing and, on the other hand, between adjacent silanol groups, thus forming a crosslinked structure at the surface of the glass fibres. This crosslinked structure seems to enhance the fibre resistance to corrosion, typically to hydrolysis. Adhesion of the sizing with the matrix can be enhanced by the organic function of the silane coupling agent and by a film former, which nature depends on the matrix used. Sizing compositions usually comprise other additive such as a lubricant, antistatic agents, and the like. Numerous sizing compositions for glass fibres have been proposed in the art, as e.g., in JP2006016559, JP2006016558, JP2006016557, WO2004110948, U.S. Pat. No. 5,877,240, WO9818734, U.S. Pat. No. 4,448,910, WO200149627, WO200048957, WO200836224, US20070154697, WO200767667, US20070072989, WO200431246, WO200356095, WO200353875, US20060083922, WO200288044, WO200026155, WO9855415, WO9742129, CA2127015, EP-635462, US5389440, and are reviewed in E. P. Pluedemann, "*Silane Coupling Agents*", Plenium Press (1982). Sizing compositions can be applied.

Sizing compositions can be applied to the fibre surface at a single coating station or, can be formulated as a two-part composition to be applied at two coating stations. The latter technique permits to formulate sizing compositions combining components which are reactive with one another, which would be unsuitable for a one-station application process because of their limited shelf life. Two part sizing compositions are usually composed of a precursor applied first to the surface of the fibres, and of a binder applied thereafter. They are most suited for chopped fibres, wherein the precursor is applied to the fibre surface as they are drawn out of a bushing. The precursor coated fibres are then chopped and collected into a container wherein they are coated with the binder, usually by spraying thus forming fibre pellets. A thermal treatment is then applied to the fibre pellets to evaporate water and to react the components of the sizing composition with the glass fibre surface and with one another.

The sized fibre pellets can advantageously be blended with a thermoplastic polymer in the screw of an extruder, wherein the fibre pellets are disrupted and the length of the fibres further decreased while they are homogenously mixed with the polymer; An extruded profile, generally in the shape of a wire, is chopped to form pellets of the polymer loaded with short glass fibres. Said pellets can be melted and shaped into a final part by injection moulding or extrusion.

The present invention proposes sizing compositions for glass fibres which yield high mechanical properties measured both dry as moulded (DAM) and after ageing in moist conditions. The sizing is particularly effective with thermoplastic polyester matrices. This and other advantages of the present invention are presented in the following.

SUMMARY OF THE INVENTION

Figure 1:
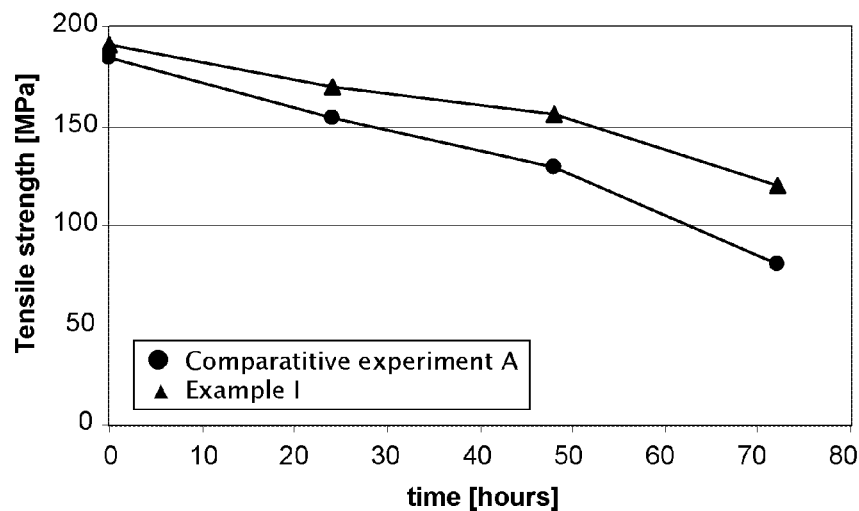
FIG. 1 Time dependence of test bars' tensile strength—Comparative experiment A versus Example I FIG. 2 Time dependence of test bars' tensile strength—Comparative experiment B versus Example II FIG. 3 Time dependence of test bars' tensile strength—Comparative experiment C versus Example I FIG. 4 Time dependence of test bars' tensile strength—Example III vs. Example IV versus Example V
Figure 2:
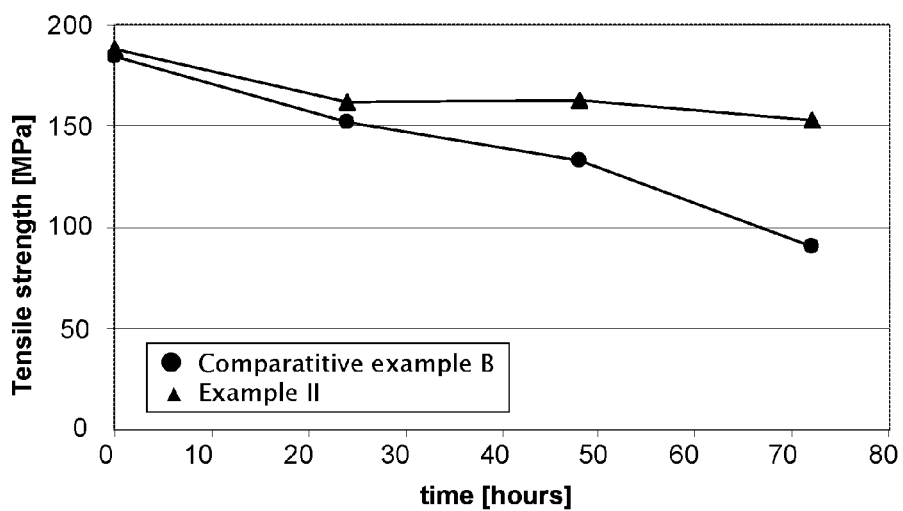
Figure 3:
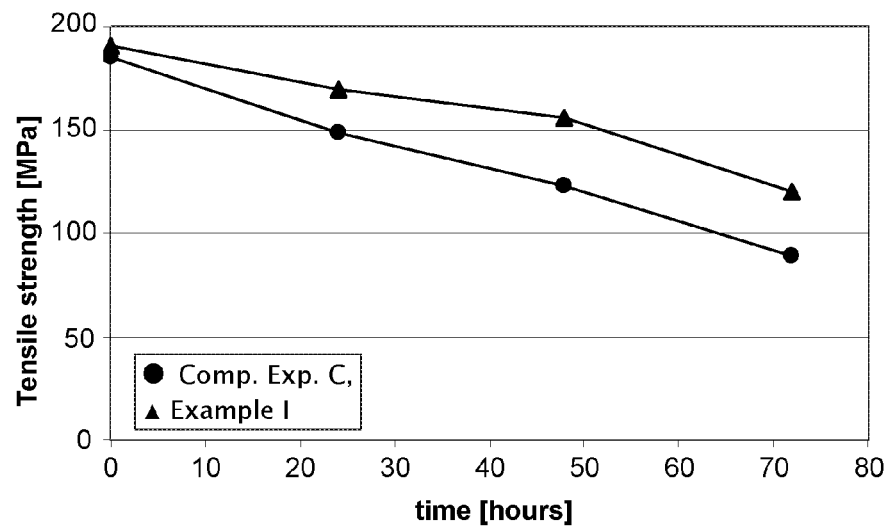
Figure 4:
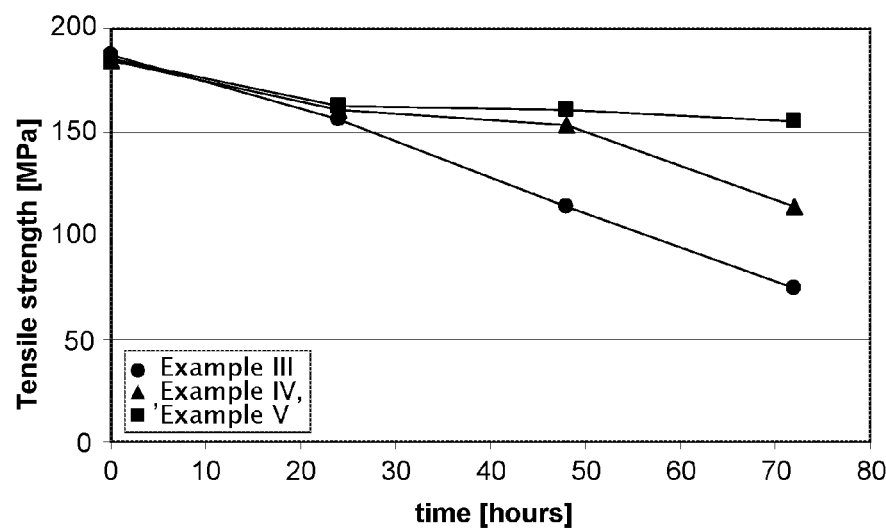

The present invention is defined in the appended independent claims. Preferred embodiments are defined in the dependent claims. In particular, the present invention concerns a pellet comprising glass fibres and a polyester matrix, wherein the glass fibre at least partially has been coated with a two-part sizing composition comprising:

(A) A precursor comprising:
  (a) An aminosilane and
  (b) a polymer or copolymer containing carboxylic acid and/or anhydride, both having a functionality, F≥3, and (B) A binder comprising a multifunctional epoxy resin of functionality, F≥3, and wherein the pellet has been subjected to a solid state post condensation process (SSPC).

The present invention also concerns a pellet comprising glass fibres and a polyester matrix, wherein the glass fibre at least partially has been coated with a two-part sizing composition comprising:
(A) a precursor comprising:
 (a) An aminosilane and
 (b) a polymer or copolymer containing carboxylic acid and/or anhydride, both having a functionality, F≥3, and
(B) a binder comprising a multifunctional epoxy resin of functionality, F≥3, wherein the matrix is a thermoplastic polyester containing a stabilizer selected from:
 (a) polycarbodiimide and/or
 (b) an epoxy group containing stabilizer.

In a preferred embodiment, the anhydride contained in said polymer or copolymer is maleic anhydride, and/or the carboxilic acid contained is said polymer is polyacrylic acid. The total amount of polymer or copolymer containing carboxylic acid and/or anhydride of functionality, F≥3 is preferably present in the dry composition in an amount comprised between 5.0 and 60.0 wt. %, more preferably between 15.0 and 30.0 wt. %

In particular, said multifunctional epoxy resin may comprise a novolac type epoxy, preferably epoxy phenol novolac (EPN) or epoxy cresol novolac. Said multifunctional epoxy resin is preferably present in the dry composition in an amount comprised between 30 and 90 wt. %, more preferably between 50 and 70 wt. %. The aminosilane is preferably selected from one or more of an;
 (a) aminodialkoxysilane, such as γ-aminopropylmethyldiethoxysilane, N-β-(Aminoethyl)-gamma-aminopropyl-methyldimethoxysilane, N-β-(Aminoethyl)-γ-aminopropyl-methyldimethoxysilane, N-β-(Aminoethyl)-γ-aminoisobutylmethyldimethoxy-silane, γ-aminopropylmethyldimethoxysilane, N-β-(Aminoethyl)-γ-aminopropyl-methyldiethoxysilane, and/or
 (b) aminotrialkoxysilane, such as γ-aminopropyltriethoxysilane, γ-aminopropyltrimethoxysilane, N-β-(Aminoethyl)-γ-aminopropyl-tri-methoxysilane, N-β-(Aminoethyl)-γ-aminopropyltriethoxysilane, diethylenetriaminopropyltrimethoxysilane, Bis-(γ-trimethoxysilylpropyl)amine, N-phenyl-γ-aminopropyltrimethoxysilane, γ-amino-3,3-dimethylbutyltrimethoxysilane, γ-aminobutyltriethoxysilane, polyazamide silane.

Said aminosilane is preferably present in the dry composition in an amount comprised between 2.5 and 20.0 wt. %, more preferably between 5.0 and 15.0 wt. %.

The sizing of the present invention may also comprise a film former. Film formers preferably comprise a polyurethane or a (meth-)acrylate polymer or co-polymer, or mixtures thereof, said film former being preferably present in the precursor in a n amount of 0.1 to 50.0 wt. % with respect to the total dry weight of the composition, more preferably 10.0 to 30.0 wt. %. It may further comprise additives selected from on e or more of:
 pH adjusters, such as bases, preferably ammonia or sodium hydroxide, and acids, preferably acetic acid or phosphoric acid,
 a non-ionic lubricant, preferably a fatty alcohols ethoxylated or fatty acid monoester of polyethylene glycol, such as PEG 200 Monolaurate, PEG 600 Monooleate, PEG 600 Monostearate, PEG 400 Monostearate PEG 400 Monooleate, PEG 600 Monolaurate, the non-ionic lubricant being preferably present in an amount of 0.1 to 30.0 wt. % solids, more preferably from 1.0 to 20.0 wt. % solids, most preferably from 2.0 to 5.0 wt. % solids;
 a cationic lubricant, such as a polyethyleneimine polyamide salt, and is preferably present in the size composition in an amount from 0.1 to 30.0 wt. % solids, more preferably from 1.0 to 20.0 wt. % solids, most preferably from 2.0 to 5.0 wt. % solids,
 an antistatic agent, such as a quaternary ammonium, a tetraethylammonium chloride, or lithium chloride, and is preferably present in an amount of 0.1 to 5.0 wt. % solids, preferably from 0.5 to 1.5 wt. % solids.
 anti-foaming agents, such as polysiloxane derivatives, the anti-foaming agent being preferably present in amount of less than 0.1% of total weight of sizing without water,
 an isocyanate based cross-linker, such as an isocyanurate, biuret, carbodiimide, the isocyanate based cross-linker being preferably present in amount of 0.1 to 50% of total weight of sizing without water, more preferably between 10 and 30.0 wt. %;
 a boron-containing compound selected from the group consisting of boric acid, boron oxide, sodium tetraborate, potassium metaborate, potassium tetraborate, ammonium biborate, ammonium tetrafluoroborate, butylammonium tetrafluoroborate, calcium tetrafluoroborate, lithium fluoroborate, potassium tetrafluoroborate, sodium tetrafluoroborate, tetrabutylammonium tetrafluoroborate, tetraethylammonium tetrafluoroborate and zinc tetrafluoroborate; the boron containing compound is preferably present in an amount of 0.1 to 50.0% with respect to the total dry weight of the composition, more preferably between 10.0 to 30.0 wt. %, most preferably between 2.5 and 10.0 wt. %;

The glass fibre is at least partially coated with the reaction product of a sizing composition as discussed above. The two-part sizing of the present invention may be applied to the surface of glass fibres with the following steps:
 (a) Forming glass fibres out of a bushing,
 (b) Applying the precursor of a sizing composition as discussed supra onto the surface of the glass fibres at a first application station,
 (c) Applying the binder of a sizing composition as discussed supra onto the precursor coated surface of the glass fibres at a second application station, and
 (d) Allowing the two-part sizing composition to react and form a sizing covalently bond to the surface of the glass fibres.

In a preferred embodiment, the glass fibres are chopped into short fibres after the application of the precursor, which is preferably applied with a roller, and before the application of the binder, which is preferably applied by spraying.

Glass fibres according to the present invention are advantageously used in a fibre reinforced composite comprising a polyester as a polymer matrix, more preferably PBT or PET, and most preferably PET. As understood by a person skilled in the art, a "polymeric matrix" in a fibre reinforced composite material is meant herein as the binding phase of a fibre reinforced composite. It comprises a polymer or blend of polymers and may comprise various additives, such as plasticisers, antiflame agents, pigments, and the like. For short glass fibre reinforced composites, short, chopped glass fibres are generally blended with a polymeric melt in an extruder, a composite wire is drawn out of the extruder die and chopped to form short fibre reinforced pellets or granules, the two terms being considered herein as synonymous. Such pellets can then be melted again in the screw of an injection moulding machine or of an extruder to form final short glass fibre reinforced composite parts or continuous profiles, respectively.

The pellets reinforced with glass fibres according to the present invention may be formed in an extruder as explained supra by blending a thermoplastic polyester, preferably PET of relatively low molecular weight. After formation of the pellets, these are subjected to a solid state post condensation process (SSPC). The SSPC step is preferably carried out by exposing the pellets to a temperature comprised between 160° C. and 245° C., more preferably between 170° C. and 240° C., and preferably in an inert gas atmosphere at a pressure of less than 10 kPa, more preferably less than 1 kPa, even more preferably less than 500 Pa.

Additional increase in the hydrolysis resistance of polyester composites reinforced with the glass fibres of the present invention is obtained by adding a stabilizer to the polyester. The stabilizer is preferably added in an amount between 0.1 and 3.0 wt. %, more preferably between 0.5 and 1.5 wt. %, and should be selected from polycarbodiimide and/or an epoxy group containing stabilizer. The epoxy group containing stabilizer is preferably an epoxidized fatty acid ester or ether, preferably an epoxidized vegetable oil such as epoxidized soybean oil or talloil, or most preferably epoxidized linseed oil.

Nucleating agents are often necessary in PET, to increase the crystallization rate to values compatible with typical injection moulding process cycles. It is preferred that, if a nucleating agent is needed, it should be inorganic. Typical nucleating agents that can be added to a PET matrix reinforced with glass fibres according to the present invention are:
   (a) metal oxides, such as, titanium dioxide, magnesium dioxide, silicon dioxide, antimony trioxide, and/or
   (b) silicates such as mica, kaolin or talc, and or
   (c) boron nitride.

The weight average particle size of the nucleating agent is preferably comprised between 0.5 and 5.0 μm, more preferably between 0.7 and 2.0 μm. It may be present in an amount of 0.02-1.0 wt. %, more preferably of 0.05-0.2 wt. %.

It has been found that addition of a nucleating agent in PET may have negative effects on the resistance to hydrolysis of glass fibre reinforced PET composites.

The sizing used in the present invention enhances the mechanical properties measured dry as moulded (DAM) or measured after ageing in moist conditions (i.e., conditions promoting hydrolysis).

DETAILED DESCRIPTION OF THE INVENTION

The sizing composition used in the present invention is a two part composition comprising a precursor and a binder, which are applied to the surface of the glass fibres separately, in that order. The precursor comprises an aminosilane and a polymer or copolymer containing carboxylic acid and/or anhydride, both having a functionality, F≥3. The binder comprises a multifunctional epoxy resin of functionality, F≥3, so that, upon crosslinking, it can form a tri-dimensional network. Preferred multifunctional epoxy resins are epoxy phenol novolac (EPN) or epoxy cresol novolac (ECN), which should be present in the dry composition in an amount comprised between 30 and 90 wt. %, more preferably between 50 and 70 wt. %.

The aminosilane coupling agent preferably comprises monomeric or oligomeric (<6 units) silanes. Trialkoxysilanes are usually used as they permit to form a tri-dimensional network of Si—O—Si covalent bonds at the surface and around the surface of the glass fibres. Dialkoxysilanes, on the other hand, decrease the amount of inter-silane chains covalent bonds, and form a hair like structure at the surface of the glass fibres. Whilst a tri-dimensional silane network is generally recognized as improving resistance to hydrolysis of the fibre by the formation of a densely crosslinked protective sheath around the fibres, it also tends to form fibre clusters by reaction between silanes of adjacent fibres, which a polymeric matrix melt cannot impregnate completely. The hair like structure obtained with dialkoxysilanes, on the other hand, do not form a densely crosslinked protective sheath around the fibres, but facilitates impregnation of the fibre bundles and wetting of the individual fibres by a polymer melt. With a lower polarity than trialkoxysilane, dialkoxysilanes reduce the hydrophilicity of the surface of the glass fibres which is believed to contribute to an enhancement of the resistance to hydrolysis to a level comparable to trialkoxysilane based silanes. According to the present invention, trialkoxysilanes, dialkoxysilanes, and mixtures thereof can be used to form the silane coupling agent of the sizing, so that the crosslinking density around the glass fibres can be optimized at will. The silane based coupling agent should be present in an amount of 2 to 40 wt. % of total weight of sizing without water, preferably from 2.5 to 20.0 wt. %, more preferably from 5.0 to 15.0 wt. %.

Examples of aminosilanes which can be used alone or in combinations in the sizing of the present invention comprise:
   (a) aminodialkoxysilane, such as γ-aminopropylmethyldiethoxysilane, N-β-(Aminoethyl)-gamma-aminopropylmethyldimethoxysilane, N-β-(Aminoethyl)-γ-aminopropyl-methyldimethoxysilane, N-β-(Aminoethyl)-γ-aminoisobutylmethyldimethoxy-silane, γ-aminopropylmethyldimethoxysilane, N-β-(Aminoethyl)-γ-aminopropyl-methyldiethoxysilane, and/or
   (b) aminotrialkoxysilane, such as γ-aminopropyltriethoxysilane, γ-aminopropyltrimethoxysilane, N-β-(Aminoethyl)-γ-aminopropyl-tri-methoxysilane, N-β-(Aminoethyl)-γ-aminopropyltriethoxysilane, diethylenetriaminopropyltrimethoxysilane, Bis-(γ-trimethoxysilylpropyl)amine, N-phenyl-γ-aminopropyltrimethoxysilane, γ-amino-3,3-dimethylbutyltrimethoxysilane, γ-aminobutyltriethoxysilane, polyazamide silane.

A polymer or co-polymer containing anhydride, in particular maleic anhydride and/or a carboxylic acid of functionality greater than 2 (F≥3) are used as crosslinker of the sizing composition. Maleic anhydride and multifunctional epoxy resins of functionality, F≥3, such as EPN or ECN, have been used individually as alternative crosslinkers in many sizing compositions disclosed in the documents cited in the BACKGROUND ART section supra. To our knowledge, they have, however, never been used in combination before. The reasons for this are very simple. First, they are considered as alternative crosslinkers, fulfilling the same function, so that there is no apparent reason to mix them. Second, a (co-)polymer containing maleic anhydride which is soluble in water would generally form a highly unstable dispersion with any multifunctional epoxy resins, yielding a composition with limited reproducibility and shelf life. The latter problem is solved in the present invention by separating the maleic anhydride present in the precursor from the multifunctional epoxy resin present in the binder, such that the two components enter in contact with one another on the surface of the glass fibres. Examples of (co-)polymers containing anhydride comprise a copolymer ethylene-alt-maleic anhydride for example OC100LW.E from Michelman, copolymer butadiene-alt-maleic anhydride such as Maldene from Lindau Chemical, copolymer isobutylene-alt-maleic anhydride such as Isobam from Kuraray, copolymer acrylates-maleic anhydride such as Dicnal from DIC, and the like. Examples of (co-)polymers comprising carboxylic acid include polyacrylic acid such as Glascol C95 available from BASF. (Co-)polymers containing anhydride and carboxylic acid can be used alternatively or in combination. (Co-)polymers containing anhydride are preferred. The total amount of polymer or copolymer containing carboxylic acid and/or anhydride of functionality, F≥3 present in the dry composition is preferably comprised between 5.0 and 60.0 wt. %, more preferably between 15.0 and 30.0 wt. %.

The combination of both multifunctional epoxy resin and maleic anhydride and/or carboxylic acid (co-)polymer has surprisingly revealed advantageous. First, it increases the resistance to hydrolysis of a composite reinforced with glass fibres sized with such sizing. Without wishing to be bound by any theory, this is believed to be attributed to the dense crosslinked sheath formed around the glass fibres by reaction of epoxy groups with maleic anhydride groups. Furthermore, since both (co-)polymers containing maleic anhydride and epoxy resins are quite resistant to hydrolysis due to the mainly aliphatic nature of their respective backbones. By contrast, polyurethanes, usually used in combination with either a maleic anhydride or an epoxy novolac in the sizing compositions of the prior art, are themselves quite sensitive to hydrolysis. This could explain why such sizing compositions offer a weaker protection against hydrolysis to composite materials.

Second, by reacting with the epoxy groups, the maleic anhydride groups prevent the multifunctional epoxy resin from migrating into the polymeric matrix during the compounding or blending step in an extruder. It is important that as little multifunctional reactive components as possible migrate into the polymeric matrix, lest covalent bonds are formed in the matrix, which would increase the viscosity of the matrix. During the subsequent injection moulding operation, the shear forces generated increase with the viscosity of the blend, leading to the breakage of more glass fibres to the detriment of the mechanical properties of the thus injection moulded parts. Preventing the migration of the multifunctional epoxy resin such as EPN or ECN into the matrix is even more important in case the matrix is exposed to a thermal treatment such as solid state post-condensation (SSPC) after blending with the glass fibres, as such thermal treatments promote diffusion and crosslinking of such resins in the matrix.

The sizing used in present invention preferably comprises a film former. A film former interacts with both the silane coupling agent and the matrix upon impregnation of the fibres. The film former must therefore be compatible with the matrix to be used. A film former protects the glass fibre from damage during processing (e.g., weaving, knitting, braiding, etc.) and promotes compatibility of the fibres with the matrix. It is not necessary that the film former forms any—or at least not extensive—covalent bonds with the silane coupling agent. It is actually even desirable to find film former molecules diluted in the matrix, as this is a sign of excellent compatibility between the two. Fibre reinforced composites are very sensitive to hydrolysis, and the mechanical properties of a composite exposed to hydrolysis conditions may drop by over 60% or more compared with the same properties measured dry as moulded (DAM). This substantial drop in mechanical properties upon exposure to hydrolysis conditions represents a major drawback of fibre reinforced composites. In many applications, such as outdoor applications in moist environments, or high temperature under the hood applications, the parts must be dimensioned taking account of these losses in mechanical properties, thus often becoming financially and technically (heavier) less competitive than alternative materials such as metals. Preferred film formers for a sizing according to the present invention comprise a polyurethane or a (meth-)acrylate polymer or co-polymer, or mixtures thereof. Other possible film formers, preferably admixed to one of the foregoing film formers, but also usable alone, comprise: an epoxy resin emulsion, preferably based on any of an epoxy bisphenol A or epoxy bisphenol F; an epoxy ester resin; an epoxy urethane resin; a polyamide; or mixtures thereof. The film former or mixture of film formers is preferably present in the precursor in an amount of 0.1 to 50.0 wt. % with respect to the total dry weight of the composition, more preferably 10.0 to 30.0 wt. %. The sizing composition used in the present invention may comprise a number of additives, such as any of the following taken alone or in any combination:

- pH adjusters, such as bases, preferably ammonia or sodium hydroxide, and acids, preferably acetic acid or phosphoric acid,
- a non-ionic lubricant, preferably a fatty alcohols ethoxylated or fatty acid monoester of polyethylene glycol, such as PEG 200 Monolaurate, PEG 600 Monooleate, PEG 600 Monostearate, PEG 400 Monostearate PEG 400 Monooleate, PEG 600 Monolaurate, the non-ionic lubricant being preferably present in an amount of 0.1 to 30.0 wt. % solids, more preferably from 1.0 to 20.0 wt. % solids, most preferably from 2.0 to 5.0 wt. % solids;
- a cationic lubricant, such as a polyethyleneimine polyamide salt, and is preferably present in the size composition in an amount from 0.1 to 30.0 wt. % solids, more preferably from 1.0 to 20.0 wt. % solids, most preferably from 2.0 to 5.0 wt. % solids,
- an antistatic agent, such as a quaternary ammonium, a tetraethylammonium chloride, or lithium chloride, and is preferably present in an amount of 0.1 to 5.0 wt. % solids, preferably from 0.5 to 1.5 wt. % solids.
- anti-foaming agents, such as polysiloxane derivatives, the anti-foaming agent being preferably present in amount of less than 0.1% of total weight of sizing without water,
- an isocyanate based cross-linker, such as an isocyanurate, biuret, carbodiimide, the isocyanate based cross-linker being preferably present in amount of 0.1 to 50% of total weight of sizing without water, more preferably between 10 and 30.0 wt. %;
- a boron-containing compound selected from the group consisting of boric acid, boron oxide, sodium tetraborate, potassium metaborate, potassium tetraborate, ammonium biborate, ammonium tetrafluoroborate, butylammonium tetrafluoroborate, calcium tetrafluoroborate, lithium fluoroborate, potassium tetrafluoroborate, sodium tetrafluoroborate, tetrabutylammonium tetrafluoroborate, tetraethylammonium tetrafluoroborate and zinc tetrafluoroborate; the boron containing compound is preferably present in an amount of 0.1 to 50.0% with respect to the total dry weight of the composition, more preferably between 10.0 to 30.0 wt. %, most preferably between 2.5 and 10.0 wt. %;
- a hypophosphite containing compound such as a hypophosphite salt or phosphite containing compound such as: sodium hypophosphite, ammonium hypophosphite, calcium hypophosphites, trisnonylphenyl phosphite.

The sizing composition can be applied to the surface of glass fibres as they are formed out of a bushing as an aqueous composition. It must be applied in two stages: a first coating station, generally comprising a roller contacting the fibres as they are running out of a bushing, for applying a precursor as discussed above, and a second station, applying a binder as discussed above. For chopped glass fibres, the precursor is usually applied to the fibres as they continuously run out of a bushing, whilst the binder is usually sprayed onto the chopped fibres. The coated fibres are dried to evaporate the water to let the sizing composition react to form a sizing at the surface of the glass fibres. Sizing is generally applied to the surface of the glass fibres in an amount of 0.4 to 1.2 wt. % with respect to the total weight of glass fibres, preferably between 0.6 and 1.0 wt. %, more preferably between 0.8 and 09 wt. %. Unless otherwise indicated, all amounts of sizing and components in a sizing composition are expressed with respect to the total weight of sizing composition without any added water. In some cases, specifically indicated, as in the foregoing instance, Glass fibres coated with a sizing as discussed above, may reinforce thermoplastic polyester matrices in amounts comprised between 5 and 65 wt. %, preferably between 20 and 50 wt. %. Thermoplastic polyesters suitable for the present invention may be amorphous or a semi-crystalline. Preferably the thermoplastic polyester is a semi-crystalline polyester. Said semi-crystalline polyester is generally derived from at least one aromatic dicarboxylic acid or an ester-forming derivative thereof and at least one aliphatic, cycloaliphatic or aromatic diol, and includes homo- as well as copolymers. Examples of suitable aromatic diacids include terephthalic acid, isophthalic acid, naphthalene dicarboxylic acid, biphenyl dicarboxylic acid, etc., with terephthalic acid being preferred. Suitable diols include alkylane diols, benzene diol, dihydroxyphenyl, naphthalene diol. Alkane diols, like ethylene glycol, propylene glycol, 1,4-butane diol, neopentyl glycol, and cyclohexane dimethanol are preferred. These semi-crystalline polyesters may further comprise small amounts of, for example, aliphatic dicarboxylic acids, monofunctional alcohols and/or carboxylic acids and three or higher functional alcohols and/or carboxylic acids, provided that these polyesters remain melt-processable. Preferably, the content of other monomers in these polyesters is below 20 wt. %, more preferably below 10 wt. %, even more preferably below 5 wt. %, relative to the total weight of the polyester, to ensure the semi-crystallinity of the polyester.

Suitable thermoplastic polyesters that may be used in the pellets according to the invention are, for example, polyalkyleneterephthalates, polyalkylene naphthalates, and polyalkylene bisbenzoates and any copolymers and any mixtures thereof. These polyesters can be derived from alkane diols and, respectively terephthalic acid, naphthalene dicarboxylic acid and 4,4'-diphenyldicarboxylic acid. Suitably, the poly-alkyleneterephthalate is poly(1,4-cyclohexane-dimethylene terephthalate) (PCT) or a poly(alkylene terephthalate) based on an aliphatic diol with 2 to 6 carbon atoms, like polyethyleneterephthalate (PET), polytrimethyleneterephthalate (PTT), and poly(1,4-butylene terephthalate) or simply called polybutylene terephthalate (PBT). Suitable poly(alkylene naphthalate)s include polyethylenenaphthalate (PEN) and polybutylenenaphthalate (PBN). Suitable polyalkylene bisbenzoates include polyethylenebisbenzoate (PEBB) and polybutylenebisbenzoate (PBBB). Suitably, these semi-aromatic thermoplastic polyesters comprise a minority content of another dicarboxylic acid or diol. Of these polyesters, PET and PBT, and any mixture or copolymer thereof are preferred. More preferably the thermoplastic polyester is PET.

Glass fibres being coated with a sizing as described supra provide enhanced hydrolysis resistance to composite materials reinforced therewith, compared with glass fibre currently available on the market. Of course, resistance to hydrolysis also depends very much on the matrix. Surprisingly an increase in hydrolysis resistance has been obtained if the matrix is a thermoplastic polyester which has been subjected to a solid state post condensation process after blending with the glass fibres. A solid state post condensation (SSPC) process makes it possible to produce in a first step a thermoplastic polyester having a relatively low molecular weight and thus a correspondingly low viscosity. Because of the low viscosity glass fibre breakage is reduced during mixing of the glass fibres with the molten polyester. After the mixing of the glass fibres with the molten polyester, for example in an extruder, the so obtained mixture may be granulated to form pellets and cooled down.

Thereafter in a second step the actual solid state post condensation is carried out to increase the molecular weight of the polyester by subjecting the glass fibre reinforced polymer composition to a heat-treatment, preferably at a temperature close to, but below the melting point of the polyester, under reduced pressure and/or a flow of an inert gas. If the polyester is PET, the heat treatment preferably is carried out at a temperature between 160° C. and 245° C., more preferably between 170° C. and 240° C. The advantage of a higher temperature is that the time needed for obtaining the desired molecular weight is shorter. In a preferred embodiment, the inert gas atmosphere has a pressure of less than 10 kPa, more preferably less than 1 kPa, even more preferably less than 500 Pa. A lower pressure has the advantage that the required molecular weight is obtained in a shorter time. This allows a more efficient production process with a higher yield, without the need of extending the production installation.

The SSPC of the polymer composition according to the invention may be carried out by any mode and in any apparatus suitable for that purpose. The process may suitably be carried out as a batch process, for instance in a tumble dryer, or as a continuous process, for instance in a moving bed reactor.

It was surprisingly discovered that a large increase in hydrolysis resistance of a glass fibre reinforced thermoplastic polyester composite could be obtained if the polyester matrix contains a stabilizer selected from a carbodiimide and/or an epoxy group containing stabilizer The addition of small amounts of such stabilizer even permits to compensate any drop in hydrolysis resistance caused by the use of a nucleating agent. The epoxy group containing stabilizer is preferably an epoxidized fatty acid ester or ether. In particular, epoxidized vegetable oils are suitable, such as epoxidized soybean oil or talloil, or most preferably epoxidized linseed oil. Mixtures of various of the foregoing epoxydized vegetable oils can be used. A stabilizer is preferably present in an amount of 0.1-5.0 wt. %, more preferably of 0.5-2.0 wt. % with respect to the total weight of matrix. Good results are obtained if the epoxidized stabilizer contains between 0.1 and 5 wt. % of oxirane oxygen, preferably between 0.3 and 5 wt. %.

The stabilizer—preferably an epoxidized vegetable oil—is preferably dusted or sprayed onto the surface of the granulated composition after the SSPC step is completed. In this way no unwanted reactions between the epoxidized vegetable oil or the epoxidized modified vegetable oil can take place during the SSPC step.

In order to increase the crystallisation rate of the polyester, a nucleating agent is often needed. This is especially true if the polyester is PET. Unfortunately, the use of a nucleating agent was found to be somewhat detrimental to the hydrolysis resistance of fibre reinforced polyester composites. It was discovered, however, that the drop in hydrolysis resistance of polyester composites comprising nucleating agents could be limited if an inorganic nucleating agent was used. Examples of inorganic nucleating agents include metal oxides, like for example titanium dioxide, magnesium dioxide, silicon dioxide, antimony trioxide, silicates like for example mica, kaolin and talc, as well as boron nitrides. Preferably talc is used.

Preferably the weight average particle size of the nucleating agent is 0.5-5.0 µm, more preferably 0.7-2.0 µm. The concentration is preferably 0.02-1 wt. %, more preferably 0.05-0.2 wt. %.

EXAMPLES

Materials Used

PET, polyethylene terephthalate having a relative viscosity (RSV) of 1.34.
NA 1: Nucleating agent 1, Sodium benzoate, delivered by Univar Benelux.
NA 2: Nucleating agent 2, talcum, Microtalc MP 1250, delivered by Barretts Minerals Inc.
GF 1: glass fibre 1, ChopVantage™ HP 3786, glass fibre according to the state of the art, delivered by PPG Industries Fibre Glass.
GF 2: glass fibre 2: glass fibre according to the invention, having a sizing obtained from a precursor comprising 0.06 wt. % of γ-aminopropyl triethoxysilane A1100 from Momentive, 0.2 wt. % of EMA, a copolymer of ethylene maleic anhydride OC 100LW.E from Mlchelman and a binder comprising 0.6 wt. % of EPN, epoxydized phonol novolac, Epirez 5054 from Momentive.
C wax, Carnauba wax: mould release agent, Paracera™ C40, delivered by Paramelt B.V.
ELO: epoxidized linseed oil, Lankroflex E2447, delivered by Akcros Chemicals.

Preparation of PET Composition by Compounding

The polymer compositions were prepared on a ZE40A UTX twin-screw extruder from Berstorff. Barrel temperature was set at 260-310° C., screw speed was 300 RPM and yield was 180 kg/hour. The PET base polymer was dried before use (moisture content below 0.01%). Components such as PET, nucleating agent and mould release agent were dosed to the hopper as a pre-blend. The glass fibers were introduced via a side-feeder into the polymer melt. Extruded strands were cooled in water and granulated.

SSPC of the PET Composition

Heat treatment of the polymer composition was performed in a tumble-drier 100 liter unit. The drier was charged with 25 kg PET granules and pressure was reduced to 80 mbar, vented with pure, dry nitrogen and temperature raised initially to 120° C. After 1 hour at 120° C. pressure was reduced to 4 mbar and temperature was raised to 135° C. After 1 hour temperature of the granules was raised to 205° C., while pressure was kept at 4 mbar and vented with nitrogen. The granules were maintained at these conditions for between about 10 and 24 hours until a target RSV 1.43 had been reached. After this period, the samples were cooled down to room temperature.

Dusting ELO on Post-Condensated PET Composition

Of a part of the compounds the surface of the granulate was coated with epoxidized linseed oil after the SSPC step. Initially, the granulates are mixed with ELO in the tumble-drier at 23° C. and nitrogen flow, and heated up till 140° C. while rotating. After 2 hours the material was cooled down to room temperature.

Preparation of Test Bars by Injection Moulding.

Tensile test bars according to the ISO 527 standard were injection moulded from pre-dried (10 hours at 120° C. under vacuum with nitrogen flow) granules on an Arburg 110 injection moulding machine, with temperature settings 260-270° C., and mould temperature of 140° C.

Test Methods Used
Relative Solution Viscosity

The relative solution viscosity (RSV) was determined in a solution of 0.5 gram of polymer in 100 ml of dichloroacetic acid at 25° C. (method based upon ISO 1628-5).

Mechanical Properties

The tensile test is carried out at 23° C. with injection moulded ISO 527 type 1A bars. Testing of the tensile test bars occurs in accordance with the ISO 127 standard. Tensile testing speed 5 mm/min.

Hydrolysis Resistance

Mechanical tests have been carried after exposing tensile test bars in an autoclave at a temperature of 110° C. (pressure 1.4 bar, steam atmosphere), for 24, 48, and 72 hours, respectively.

Comparative Experiment A

Pellets were prepared and tested comprising 35 wt. % of glass fibres 1, according to the state of the art, 0.35 wt. % of Carnauba wax, the balance being PET.

The pellets were subjected to solid state post condensation (SSPC). The hydrolysis resistance was determined as described above. The tensile strength of the test samples is given in Graph 1 as a function of exposure time. The tensile strength of the test sample after 72 hours exposure is given in table 1.

Example I

As comparative experiment A, however instead of glass fibre 1, according to the state of the art, glass fibre 2, according to the invention was used. The tensile strength of the test samples is given in Graph 1 as a function of the exposure time. The tensile strength of the test sample after 72 hours exposure is given in table 1.

From the comparison of the results of comparative experiment A and example I it is clear that because of the use of glass fibre 2, the glass fibre according to the invention, an increase in hydrolysis resistance has been obtained.

Comparative Experiment B

As comparative experiment A, however after the SSPC step the surface of the pellets was dusted with 0.5 parts by weight of ELO at 100 parts by weight of the composition obtained after SSPC.

The tensile strength of the test samples is given in Graph 2 as a function of the exposure time. The tensile strength of the test sample after 72 hours exposure is given in table 1.

Example II

As example I, however after the SSPC step the surface of the pellets was dusted with 0.5 parts by weight of ELO at 100 parts by weight of the composition obtained after SSPC.

The tensile strength of the test samples is given in Graph 2 as a function of the exposure time. The tensile strength of the test sample after 72 hours exposure is given in table 1.

The hydrolysis resistance of the composition of Example II, comprising the glass fibre 2, according to the invention, is much better than the hydrolysis resistance of composition of comparative experiment B, comprising the glass fibre according to the state of the art. It is clear that the positive effect of ELO on the hydrolysis resistance is higher, if the glass fibre according to the invention is used. This is confirmed by the comparison in table 1 of the results of Comparative experiment A vs Example I (increase in tensile strength from 81-91 MPa) and Comparative experiment B vs. Example II (increase in tensile strength from 120-153 MPa).

Comparative Experiment C

As example I, however the composition was not subjected to a SSPC step.

In Graph 3 the tensile strength of the test samples is given as a function of exposure time, together with the results of the test samples of example I. The tensile strength of the test sample after 72 hours exposure is given in table 1.

From the comparison of the results of example I and comparative experiment C is shown that after SSPC the hydrolysis resistance of the composition according to the invention has considerably been improved.

Example III and IV

As Example II, however with 0.1 wt. % nucleating agent 1, sodium benzoate (Example IV) respectively 0.1 wt. % nucleating agent 2, talcum (Example V). The tensile strength of the test samples is given in Graph 4. The tensile strength of the test sample after 72 hours exposure is given in table 1.

It is clear that with talcum, an inorganic nucleating agent the hydrolysis resistance is at a higher level than with sodium benzoate, an organic nucleating agent.

The level of hydrolysis resistance is negatively influenced by the addition of a nucleating agent. However, if a fast crystallization during the processing of the composition is required, it is necessary to use a nucleating agent.

Example V

As Example IV, however with 1.3 parts of ELO dusted at the surface of the pellets. The tensile strength of the test samples is given in Graph 4. The tensile strength of the test sample after 72 hours exposure is given in table 1.

The tensile strength of the composition according to Example V is, even with the use of a nucleating agent, at a very high level.

The invention claimed is:

1. A pellet comprising glass fibres and a thermoplastic polyester matrix, wherein the glass fibres are at least partially coated with a two-part sizing composition comprising:
(A) a precursor comprising:
(a) an aminosilane and
(b) a polymer or copolymer containing carboxylic acid and/or anhydride, both having a functionality, F≥3, and
(B) a binder comprising a multifunctional epoxy resin of functionality, F≥3, and wherein the pellet has been subjected to a solid state post condensation process (SSPC).

2. A pellet comprising glass fibres and a polyester matrix, wherein the glass fibres are at least partially coated with a two-part sizing composition comprising:
(A) a precursor comprising:
(a) an aminosilane, and
(b) a polymer or copolymer containing carboxylic acid and/or anhydride, both having a functionality, F≥3, and
(B) a binder comprising a multifunctional epoxy resin of functionality, F≥3, wherein the polyester matrix is a thermoplastic polyester containing a stabilizer selected from
(i) polycarbodiimide and/or=(ii) an epoxy group containing stabilizer.

3. A pellet according to claim 1, wherein the anhydride contained in said polymer or copolymer (b) is maleic anhydride, and/or the carboxilic acid contained in said polymer or copolymer (b) is acrylic acid.

4. A pellet according to claim 1, wherein said multifunctional epoxy resin comprises a novolac type epoxy.

5. A pellet according to claim 1, wherein the aminosilane is selected from one or more of an aminodialkoxysilane and/or aminotrialkoxysilane.

6. A pellet according to claim 1, wherein the sizing further comprises at least one additive selected from the group consisting of filmformers, Ph adjusters, a non-ionic lubricants, cationic lubricants, antistatic agents, anti-foaming agents, isocyanate based cross-linkers and boron compounds.

7. A pellet according to claim 1, wherein the thermoplastic polyester matrix is polyethylene terephthalate (PET).

8. A pellet according to claim 1, wherein the thermoplastic polyester matrix is a thermoplastic polyester containing a stabilizer selected from (i) polycarbodiimide and/or (ii) an epoxy group containing stabilizer.

9. A pellet according to claim 8, wherein the epoxy group containing stabilizer is an epoxidized fatty acid ester or ether.

10. A pellet according to claim 1, wherein the thermoplastic polyester matrix is a thermoplastic polyester comprising an inorganic nucleating agent.

11. A process for producing a pellet according to claim 1, comprising:
(a) blending in an extruder the glass fibres with the thermoplastic polyester matrix to form glass fibre reinforced polyester pellets; and
(b) subjecting the pellets to a solid state post condensation process (SSPC).

12. The process according to claim 11, wherein the solid state post condensation step (b) is carried out at a temperature comprised between 160° C. and 245° C.

13. The process according to claim 11, which further comprises adding a stabilizer to the glass fibre reinforced polyester pellets after conducting the SSPC.

* * * * *